H. C. MUELLER.
ARMATURE WINDING MECHANISM.
APPLICATION FILED JUNE 1, 1915.

1,312,564.

Patented Aug. 12, 1919.
3 SHEETS—SHEET 1.

Witnesses
F. O. Otto
I. D. Bremer.

Inventor
Herman Charles Mueller
By Erwin & Wheeler
Attorneys

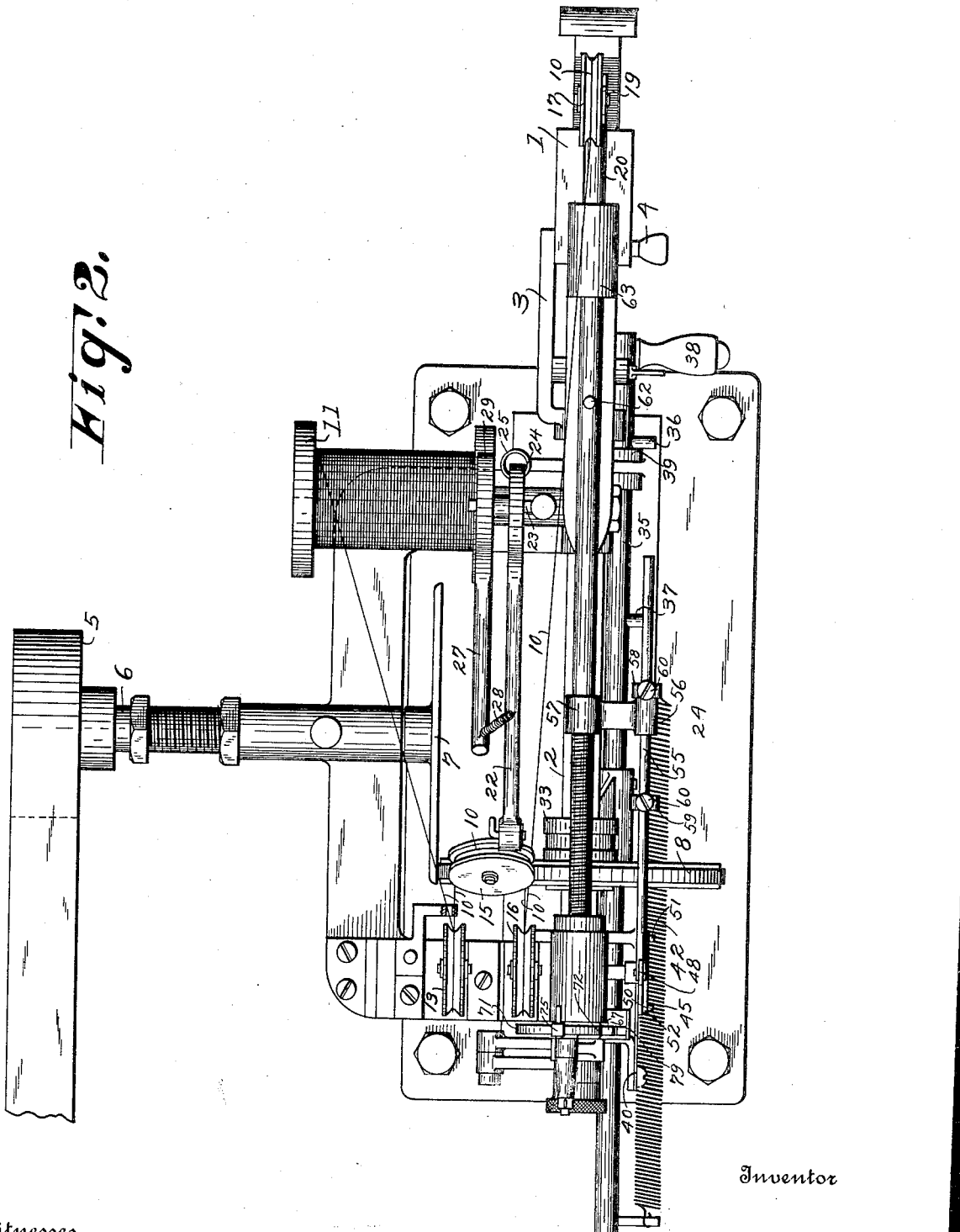

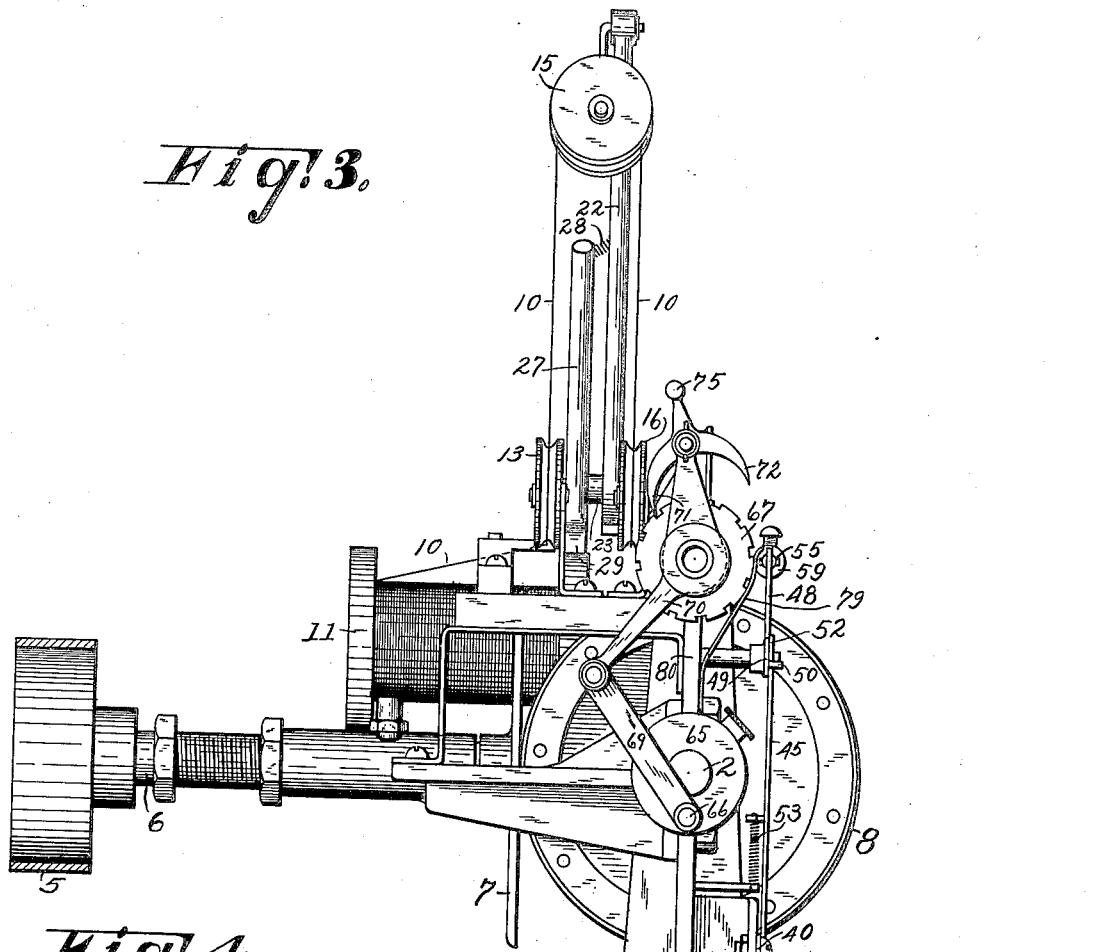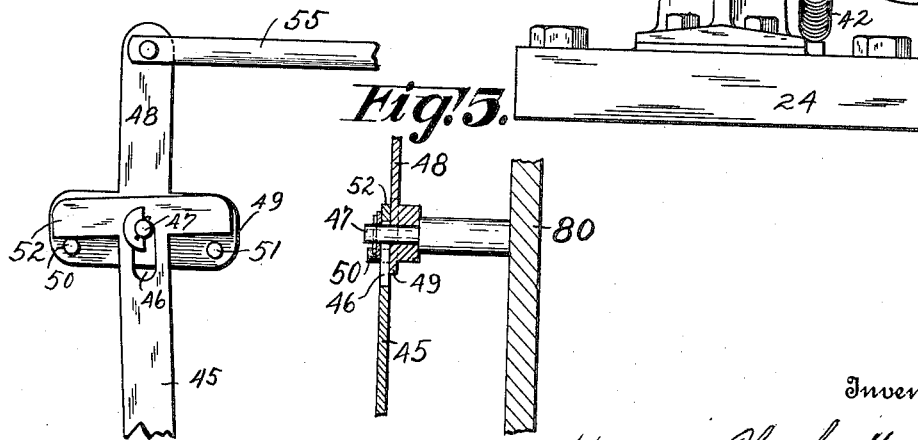

UNITED STATES PATENT OFFICE.

HERMAN CHARLES MUELLER, OF MILWAUKEE, WISCONSIN.

ARMATURE-WINDING MECHANISM.

1,312,564.          Specification of Letters Patent.      Patented Aug. 12, 1919.

Application filed June 1, 1915. Serial No. 31,354.

*To all whom it may concern:*

Be it known that I, HERMAN CHARLES MUELLER, a citizen of the United States, residing at Milwaukee, county of Milwaukee, and State of Wisconsin, have invented new and useful Improvements in Armature-Winding Mechanisms, of which the following is a specification.

My invention relates to improvements in armature winding mechanisms.

The object of my invention is to produce an efficient armature winding machine in which the wire will be accurately coiled upon the spool and the machine automatically stopped at the completion of each coil or layer, pending the adjustment of a layer of insulation thereon and following which the winding operation will be continued in the direction of the opposite end of the armature core, a proper tension on the wire being continuously maintained.

In the drawings—

Fig. 2 is a plan view of the same.

Fig. 3 is a rear end elevation.

Fig. 4 is a detail view of the toggle jointed trip latch.

Fig. 5 is a fragmentary view in transverse section, drawn on line $x$—$x$ of Fig. 1.

Like parts are identified by the same reference characters throughout the several views.

Figure 1:
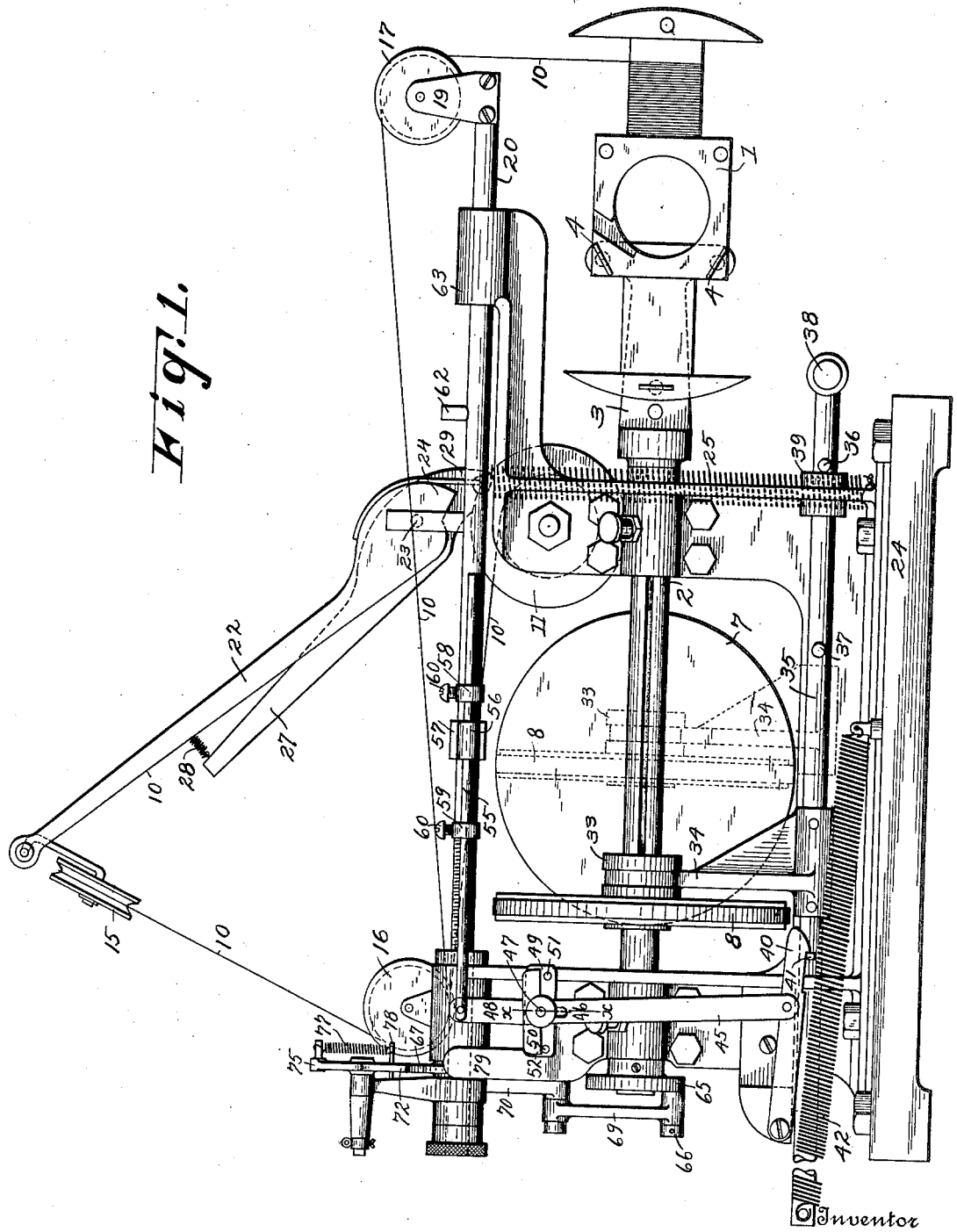
Figure 1 is a side elevation of my improved armature winding machine.

The armature 1 is supported from a shaft 2 by a holder 3 with which it is temporarily connected by clamping bolts or screws 4. The shaft 2 is driven from any suitable source of power through the pulley 5, shaft 6, and friction disks 7 and 8. The friction disk 8 is mounted on the shaft 2 and splined thereto for longitudinal adjustment, whereby it may be shifted to a neutral position at the axis of the disk 7, and to stop rotation of the shaft 2 when any given coil is completed to the end of the armature core. The shifting movement is automatic as will be hereinafter explained.

The wire 10 is supplied from a spool 11, rotatively mounted upon a projecting shaft or stud connected with the frame of the machine. The wire extends from this spool around an idle pulley 13, a resiliently supported tension pulley 15, idle pulley 16 and guiding pulley 17, the latter being supported above the armature and the wire extending downwardly thereto. The feeding pulley 17 is supported by a bracket 19 from a slide 20, which is automatically moved, step by step, with each turn of the armature in order to retain the pulley 17 in a proper position to guide the wire to the armature. The tension pulley 15 is supported from the frame by a swinging take-up lever 22 pivoted to the frame at 23 and having its short arm connected with the base 24 of the frame by a tension spring 25. A brake lever 27 is also mounted upon the fulcrum pin 23 and is connected with the upwardly projecting pulley supporting arm of lever 22 by a spring 28. The short arm 29 of the brake lever constitutes a shoe, which bears upon one end disk of the spool 11. The two levers 22 and 27 therefore coöperate in maintaining a definite relation between the pull exerted by the wire tension device and the resistance applied to the spool by the brake. This is particularly important in the structure hereinafter described wherein the armature is rotated for a period required for winding a single layer coil thereon and then automatically stopped to allow a layer of insulating material to be applied after which the winding operation is again resumed. The connection between the brake and the tension lever provides for automatically setting the brake when the armature stops and the wire tension decreases, and it also provides for an automatic release of the brake as soon as the tension on the wire is again developed by the renewed motion of the armature-supporting spindle. Further, the spring 28 provides for some brake pressure at all times, whereby the spool is prevented from spinning freely.

It will be observed that the friction disk 8 is provided with a hub 33, suitably grooved to receive the fork of a shifting arm 34, whereby the friction disk 8 may be shifted from the position in which it is illustrated in Fig. 1 to the neutral or dotted line position illustrated in said figure, thus stopping the rotation of the armature. The shifter arm 34 is secured to a slide 35, mounted in suitable bearings in the lower part of the machine, and provided with stop projections 36 and 37 to limit its longitudinal movement in these bearings. The slide is also provided with a handle 38, whereby it may be manually manipulated. When in the position illustrated in Fig. 1, the stop 36 is in contact with the frame bearing 39 and the slide is held in this position by a latch 40 pivoted to the frame and adapted to engage a catch 41 on said slide. A spring 42 connects the slide with the base 24 and is adapted to automatically shift the slide in the opposite direction when latch 40 is moved to releasing position. This shifting movement of the slide will of course be limited by the stop 37, when the latter contacts with the frame bearing 39.

The latch 40 is automatically lifted to release slide 35 whenever one coil or layer of the winding has been completed upon the armature core in either direction. This automatic latch lifting movement is derived from the slide 20, which carries the guiding pulley 17 as above explained. It will be observed that the latch 40 is provided with a latch operating link 45, the upper end of which has a slot 46 through which a pin 47 projects from the machine frame. A link operating lever 48 is pivoted to the pin 47 and is provided at its lower end with a cross bar 49, having projecting studs 50 and 51 near its respective ends. These studs extend underneath a cross bar 52 secured to the upper end of the link 45, whereby link 45 will be lifted by the stud 50, when lever 48 is swung to the right on its pivotal support 47, and will also be lifted by the stud 51 when lever 48 is swung to the left. The pin 47 serves as a guide for the link 45, owing to the fact that it loosely projects through the slot 46. A spring 53 connects link 45 with the frame and tends to hold the link down with latch 40 in locking relation to catch projection 41.

Lever 48 is provided with a horizontally disposed actuating rod 55. A collar 56, loosely encircling this rod, is rigidly connected by a clamping member 57 with the slide rod 20. Stop collars 58 and 59 are mounted on the rod 55 and adjustably secured thereto by set screws 60. One of these collars is located on each side of the sliding collar 56, whereby after slide 20 has moved a predetermined distance in either direction, the collar 56 will engage one of these stops and transmit motion through the stop and rod 55 to actuate lever 48, thereby lifting link bar 45 and latch 40. The length of the stroke for the slide 20 is therefore determined by the position of the stop collars 58 and 59, and these will therefore be spaced to correspond with the length of the armature core. The slide 20, however, is provided with a stop projection 62, adapted for contact with the frame bearing 63 to positively limit the outward movement of this slide in case the trip latch should fail to operate for any reason.

*Feed slide actuation.*

It has been stated that the feed slide 20 is actuated, step by step, in correspondence with the progressive winding movement of the wire upon the armature core. This movement is derived from the shaft 2. At the rear end of the machine, this shaft is provided with a disk 65 carrying a wrist pin 66. The rear end of the slide 20 is screw threaded and has threaded engagement in a ratchet feed nut 67. The rotation of disk 65 is transmitted to the ratchet feed nut 67 through connecting bar 69, elbow crank leler 70 and a reversible pawl centrally pivoted to the upwardly projecting arm of the elbow crank 70 and provided with ratchet engaging dogs 71 and 72 respectively, the pawl being capable of swinging adjustment upon its pivotal support to bring either of said dogs into engagement with the ratchet. It will of course be understood that the motion of the wrist pin will be transmitted to oscillate the pawl as in all ratchet feed mechanisms, the dogs 71 (or 72) engaging successively in the notches formed in the periphery of the ratchet feed nut 67 and rotatively actuating said feed nut one step during each oscillation of the pawl. When the slide 20 reaches the end of its stroke and actuates trip latch 40 as above explained, the machine will come to rest. The attendant will thereupon apply the insulation to the armature winding, after which he will reverse the pawl by grasping the operating handle 75 and tilting the pawl in the opposite direction, whereby if the dog 71 has been in engagement with the ratchet, it will be retracted therefrom and dog 72 will be brought into engagement therewith. The attendant will then push slide 35 back to a position for engagement with latch 40. During this movement, friction disk 7 will have rotated disk 8 at least one turn and the reverse operation of the ratchet will therefore have retracted collar 56 from stop 58 sufficiently to permit latch 40 to drop to a position for engagement with catch 41 on slide 35.

A tension spring 77, connected with the operating handle of the ratchet feed pawl and with a frame projection 78 tends to hold the ratchet pawl in either of its two positions of adjustment. The flat spring 79, connected with frame member 80, depends upon the ratchet wheel 67 and provides a retarding friction which prevents over-rotation.

I attach great importance to the provision of means whereby the tension upon the wire controls the brake pressure upon the wire feeding spool, for I am thereby enabled to accurately regulate the wire tension continuously during a winding operation. By my improved tension device I am enabled to accomplish more than the mere taking up of slack in the wire, for any increase in strain is not only followed by a yielding of the tension pulley to temporarily relieve the strain, but this yielding movement is transmitted to the brake lever and by relieving the brake pressure permanent relief from the strain upon the wire is secured. It will also be observed that in starting the machine, the initial pull upon the wire not only causes a movement of the tension pulley, providing sufficient slack to enable the winding operation to start without breaking the wire, but this yielding movement of the tension pulley is transmitted to the brake lever and relieves the brake pressure to such an extent that little, if any brake resistance, will be added to the inertia of the spool. It may therefore only be necessary that the pull upon the wire be sufficient to overcome this inertia in starting the rotary motion of the spool, and even this strain is distributed, owing to the fact that the tension pulley is yieldingly supported both from the frame and from the brake lever. But as soon as the inertia of the spool is overcome, it is prevented from feeding the wire too rapidly by the instant relief of wire tension which results in an upward movement of the tension pulley and thereby allows the brake to reset with a sufficient pressure to prevent a too rapid rotation of the spool.

I claim—

1. Winding mechanism, including armature rotating means, in combination with a wire guiding device, means connecting with the armature rotating means for progressively feeding said device in either direction, a trip latch controlling the armature rotating means, and devices connected with the guide feeding device for actuating the trip latch after a predetermined movement of the guide feeding device in either direction.

2. Winding mechanism including a wire guide, a slide supporting the guide, and manually reversible step by step mechanism for feeding the slide, together with a stop secured to said slide, and trip mechanism adapted to be actuated by said stop in either direction to automatically stop the operation of said step by step slide feeding mechanism.

3. Intermittent winding mechanism including automatic stopping mechanism and manual restarting mechanism, in combination with a spool support, a wire supporting spool thereon, a spring actuated brake resisting the rotation of said spool, a spring actuated wire tension device, and a resilient connection between the brake and the wire tension device adapted for maintaining a definite relation between the pull exerted by the wire tension device and the resistance supplied by said brake.

4. Intermittent winding mechanism including automatic stopping mechanism and manual restarting mechanism, in combination with a spool support, a wire supporting spool thereon, a spring actuated brake resisting the rotation of said spool, a spring actuated wire tension device, a resilient connection between the brake and the wire tension device adapted for maintaining a definite relation between the pull exerted by the wire tension device and the resistance supplied by said brake, automatic means for stopping the movement of the traveling wire guide, and manually actuated devices for subsequently starting said guide in a reverse direction.

5. Winding mechanism including the combination of a rotative support for the article to be wound, a friction driving wheel, a driven friction wheel mounted to slide upon said support along the face of said driving wheel, means for automatically shifting said driven friction wheel to the center of the driving wheel to stop the rotation of said support, a traveling wire guide, and a trip mechanism operated by the wire guide and controlling the operation of the means for shifting said friction wheel.

6. Winding mechanism including a driving friction wheel, a driven wheel having peripheral bearing on one side face of the driving friction wheel, means for shifting the driven friction wheel from the center toward the periphery of the driving wheel, a spring for automatically shifting the driven friction wheel in the opposite direction, and a trip latch adapted to retain the driven friction wheel in the manually shifted position.

7. Winding mechanism including a driving friction wheel, a driven wheel having peripheral bearing on one side face of the driving friction wheel, means for shifting the driven friction wheel from the center toward the periphery of the driving wheel, a spring for automatically shifting the driven friction wheel in the opposite direction, and a trip latch adapted to retain the driven friction wheel in the manually shifted position, together with movable wire guiding means and connections for utilizing the movement thereof to release the trip latch.

8. In a winding machine, the combination with a rotating winding-spindle and a reciprocating traverse-guide, of means to rotate the spindle, means to reciprocate the guide, stopping mechanism for the spindle and the guide, a detent to prevent operation of the stopping means, a member mounted parallel to the spindle and operatively associated with the detent, and means for moving said member at the end of each traverse of the guide to trip the detent and release the stopping mechanism.

In testimony whereof I affix my signature in the presence of two witnesses.

HERMAN CHARLES MUELLER.

Witnesses:
LEVERETT C. WHEELER,
IRMA D. BREMER.